(12) United States Patent
Lee et al.

(10) Patent No.: US 6,336,986 B1
(45) Date of Patent: *Jan. 8, 2002

(54) METHOD FOR PRODUCING HYBRID DRIVESHAFT

(75) Inventors: Dai Gil Lee, Taejun; Durk Hyun Cho, Seoul; Jin Kyung Choi, Kyungki; Seong Sik Cheon, Seoul; Seung Hwan Chang; Je Hoon Oh, both of Taejun; Kyung Geun Bang, Kyungki; Jae Wook Kwon, Seoul; Po Jin Kim, Busan; Jin Kook Kim, Taejun, all of (KR)

(73) Assignee: Korea Advanced Institute Science Technology (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/104,109

(22) Filed: Jun. 25, 1998

(30) Foreign Application Priority Data

Jul. 14, 1997 (KR) .............................. 97-32643
Sep. 18, 1997 (KR) .............................. 97-47553

(51) Int. Cl.$^7$ .............................. B65H 81/00
(52) U.S. Cl. ............ 156/172; 156/160; 464/181; 464/183; 464/903
(58) Field of Search .............................. 464/179, 183, 464/903, 181; 428/34.5, 902; 156/172, 169, 173, 175, 160

(56) References Cited

U.S. PATENT DOCUMENTS

| 3,553,978 A | 1/1971 | Williams |
| 4,131,701 A | 12/1978 | VanAuken |
| 4,171,626 A | 10/1979 | Yates et al. |
| 4,173,128 A | 11/1979 | Corvelli |
| 4,173,670 A | 11/1979 | VanAuken |
| 4,214,932 A | 7/1980 | Van Auken |
| 4,272,971 A | 6/1981 | Loyd et al. |

(List continued on next page.)

FOREIGN PATENT DOCUMENTS

JP 56-144924 * 11/1981

OTHER PUBLICATIONS

Cho, Durk H., et al "Manufacture of one piece automotive drive shafts with aluminum and composite materials" Coposite Structures, vol. 38, No. 1–4, May–Aug. 1997, pp. 309–319.*

Shields, J. "Adhesives Handbook", CRC Press, 1970, pp. 235–239.*

*Primary Examiner*—Jeff H. Aftergut
(74) *Attorney, Agent, or Firm*—Graybeal Jackson Haley LLP

(57) ABSTRACT

A hybrid shaft adapted to be used as a drive shaft of an automobile transmission system comprises a unitary cylindrical hybrid stem formed from a metal tube and a composite material layer adhered to the metal tube. The metal tube provides torque-transmission strength to the hybrid shaft while the composite material layer increases a specific modulus of the hybrid shaft. The hybrid shaft is produced by stacking a composite material layer on a metal tube, putting a thermal shrinkage tube on the composite material layer, and co-curing the metal tube and the composite material layer while exerting a longitudinal compression force on the metal tube to prevent it from being thermally expanded.

15 Claims, 6 Drawing Sheets

U.S. PATENT DOCUMENTS

| | | | |
|---|---|---|---|
| 4,348,247 A | * | 9/1982 | Loyd et al. |
| 4,535,645 A | * | 8/1985 | De Bisschop et al. .. 464/179 X |
| 4,706,659 A | * | 11/1987 | Matthews et al. ...... 464/179 X |
| 4,967,617 A | | 11/1990 | Maus et al. |
| 5,127,975 A | | 7/1992 | Zackrisson et al. |
| 5,222,915 A | | 6/1993 | Petrzelka et al. |
| 5,261,991 A | | 11/1993 | Zackrisson et al. |
| 5,601,494 A | * | 2/1997 | Duggan ................. 464/183 X |
| 5,797,180 A | * | 8/1998 | Buchholz |
| 5,988,300 A | * | 11/1999 | Pomerleau et al. |
| 6,126,770 A | * | 10/2000 | Lee et al. ................... 156/172 |

* cited by examiner

116

117

METHOD FOR PRODUCING HYBRID DRIVESHAFT

TECHNICAL FIELD

This invention relates to a driveshaft of an automobile, more particularly to a hybrid driveshaft having a stem simply formed in one piece while the stem transmits a required driving torque and has high fundamental natural bending frequency to avoid a resonant critical vibration. This invention also relates to a method for producing the hybrid driveshaft.

BACKGROUND ART

Prior arts in the technical field to which this invention is attributed are as follows: U.S. Pat. No. 5,261,991 issued on Nov. 16, 1993, and entitled "Composite Tubular Elements and Methods of Fabrication"; U.S. Pat. No. 5,127,975 issued on Jul. 7, 1992, and entitled "Method of Fabrication of Composite Reinforced Driveshaft Having End Fitting secured thereto"; U.S. Pat. No. 4,171,626 issued on Oct. 23, 1979, and entitled "Carbon fiber reinforced Composite Driveshaft"; U.S. Pat. No. 5,222,915 issued on Jun. 29, 1993, and entitled "Self-destructing Coupling Assembly for Use in Propeller Shafts of Motor Vehicles"; U.S. Pat. No. 4,131,701 issued on Dec. 26, 1978, and entitled "Composite Tubular Elements"; U.S. Pat. No. 4,173,670 issued on Nov. 6, 1979, and entitled "Composite Tubular Elements"; U.S. Pat. No. 4,214,932 issued on Jul. 29, 1980, and entitled "Method for Making Composite Tubular Elements"; U.S. Pat. No. 4,272,971 issued on Jun. 16, 1981, and entitled "Reinforced Tubular Structure"; U.S. Pat. No. 4,173,128 issued on Nov. 6, 1979, and entitled "Composite Driveshaft"; U.S. Pat. No. 4,967,617 issued on Nov. 6, 1990, and entitled "Composite Shaft with Integral Drive Elements"; and U.S. Pat. No. 3,553,978 issued on Jun. 7, 1967, and entitled "Composite Propeller Shaft Construction and Method of Making".

The driveshaft so called propeller shaft is used to transmit a driving torque from a transmission to a differential gear in an automobile. In a rear wheel driving car or a four-wheel driving car, the driveshaft is as long as 1.5~2.0 m. Although the driveshaft is designed to withstand several thousand Nm, the driveshaft may be broken when it is subject to a resonant critical vibration at speed of revolution corresponding to its fundamental bending natural frequency. In order to avoid such a catastrophic fracture, the fundamental bending natural frequency of the driveshaft has to be more than 6,500 rpm.

The fundamental bending natural frequency of the driveshaft with universal joints at both ends is in proportion to a square root of its specific modulus ($E/\rho$), and is in inverse proportion to a square of its length. In order to raise the fundamental bending natural frequency of the driveshaft, therefore, a value of the specific modulus must be increased, or the length of the driveshaft has to be shortened. As for one piece driveshaft made of steel or aluminum, it is difficult to obtain a desirable value of fundamental bending natural frequency under the condition of the length reached to 1.5~2.0 m. Thus, a conventional steel driveshaft is often produced in two pieces. Since the steel driveshaft needs an additional universal joint to connect between two pieces, it is sophisticated to produce and assemble the driveshaft.

Meanwhile, a carbon-fiber-reinforced polymer composite material (hereinafter, called as "composite material") has specific modulus more than four times of that of steel or aluminum. Thus, the driveshaft having the length reached to 1.5~2.0 m can be reduced in a unitary member with the fundamental bending natural frequency of more than 6500 rpm using the composite material.

However, it needs high cost to produce a driveshaft using only a composite material because the composite material is expensive.

SUMMARY OF INVENTION

Therefore, this invention is to propose a hybrid drive shaft in which a good torque transmission capability of metal and a high specific modulus of a composite material are well combined.

According to an aspect of this invention to accomplish the aforementioned aim, there is provided a hybrid driveshaft of an automobile. The hybrid driveshaft comprises a unitary cylindrical hybrid stem including a metal tube having high strength and a composite material layer having high specific modulus. Joints associated with a transmission and a differential gear are formed at both ends of the stem. The metal tube and the composite material layer are adhered to each other by co-curing under a high pressurized atmosphere, thereby, the metal tube and the composite material layer cooperate with each other to provide a good torque transmission capability and a high fundamental bending natural frequency of the driveshaft. Herein, the term "co-curing" means that there are simultaneously occurred several processes, that is, heating metal and composite material, lowering the viscosity of the resin of the composite material, and adhering the metal and the composite material by the resin.

According to another aspect of this invention, there is provided a method for producing a hybrid driveshaft of an automobile comprising a unitary cylindrical hybrid stem including a metal tube having high strength and a composite material layer having high specific modulus. The method comprises steps for forming joints at both ends of a metal tube, exerting an axial compressive force on the both ends of the metal tube to prevent it from being thermally expanded, stacking composite material on the metal tube, and co-curing the composite material by heating under high pressurized atmosphere so that the metal tube and the composite material are tightly adhered to each other. Preferably, the metal tube may be an aluminum alloy tube, and the composite material may be a unidirectional carbon fiber epoxy composite material. Moreover, the joints may comprise two yoke members, one of which is associated with a corresponding yoke formed in a transmission, and the other of which is associated with a corresponding yoke formed in a differential gear of an automobile. Furthermore, the axial compressive force may be exerted by a device comprising a fixed flange confronted with one end of the metal tube, a moving flange confronted with the other end of the metal tube, and a nut cooperating with a screw to force the moving flange toward the metal tube so that the metal tube is compressed between the fixed flange and the moving flange. It is preferred to accomplish mechanical and chemical roughness treatment on an outside surface of the metal tube before the stacking step of the composite material.

Other advantages and features of the present invention will become apparent from the following description, including the drawings and claims.

DETAILED DESCRIPTION OF PREFERRED EMBODIMENTS

Figure 1:
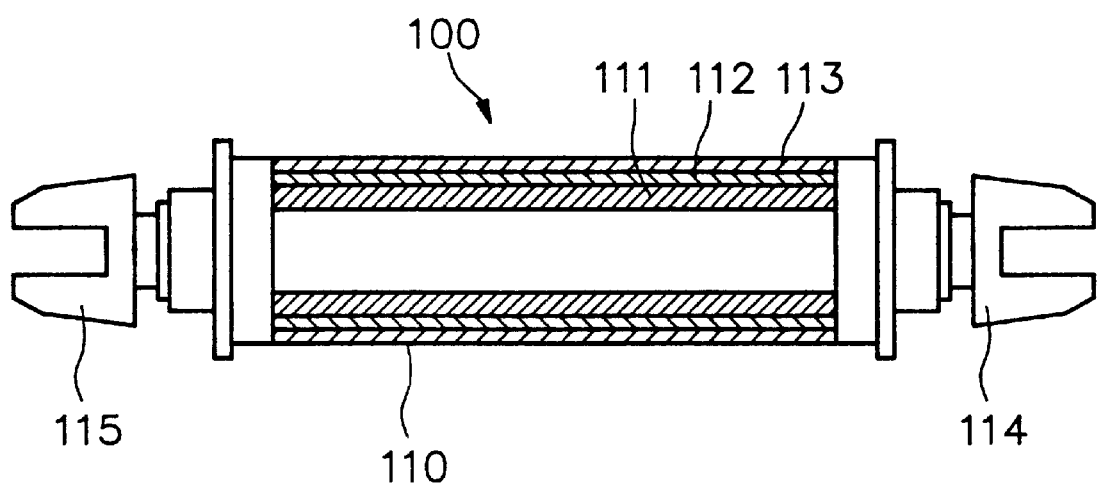
FIG. 1 shows a plan view of an embodiment of the hybrid driveshaft according to the invention with the stem shown in longitudinal section.
Figure 2:
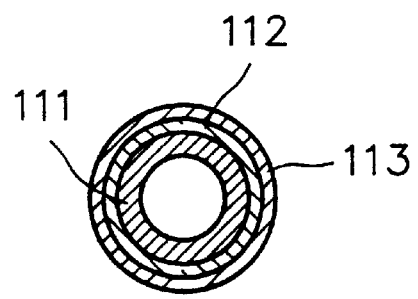
FIG. 2 shows a cross sectional view of the stem shown in FIG. 1.

As shown in FIG. 1, the hybrid driveshaft according to an embodiment of the invention comprises a stem 110 including a metal tube 111 having high strength and a composite material layer 112 formed from a unidirectional carbon fiber and epoxy resin. Two yokes 114 and 115 are formed at ends of the stem 110 so that one of them is connected to a corresponding yoke in a transmission, and the other of them is connected to a corresponding yoke in a differential gear. The hybrid driveshaft 100 has high torque transmission capability and a high fundamental bending natural frequency, which are induced from a high strength of the aluminum alloy and a high specific modulus of the composite material. In the cylindrical hybrid stem, the composite material layer 112 is tightly adhered to the aluminum alloy layer 111 by co-curing under a high-pressurized atmosphere. A coating layer 113 may be formed on the composite material layer 112 using a thermal shrinkage tube made of polyethylene resin or polypropylene resin.

Hereinafter, a method for producing the hybrid driveshaft according to the invention will be explained.

Figure 3:
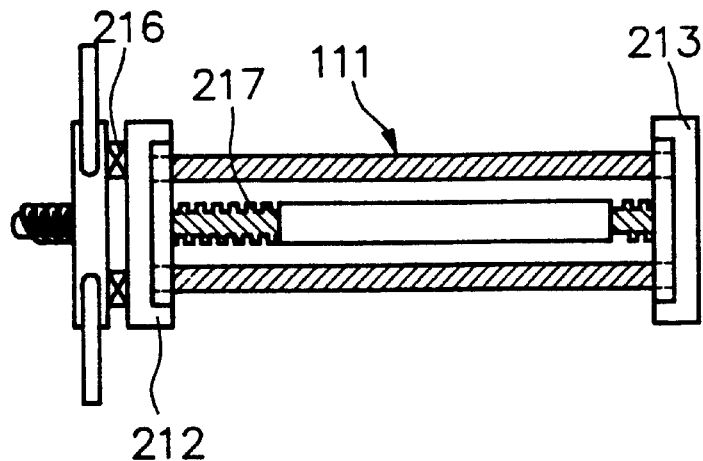
FIG. 3 shows a longitudinal section of an aluminum alloy tube compressed by a device during forming a unitary cylindrical hybrid stem.

In the method, it is very important that the composite material should be tightly adhered to the aluminum alloy while they have so different mechanical property with each other. The curing process causes thermal residual stresses between the aluminum alloy tube and the composite material since there is great difference between the coefficient of thermal expansion in the composite material, −0.9/, and that in the aluminum alloy, 23/. The problem is more serious in the longitudinal direction of the fiber of the composite material, that is, in the axial direction of the stem. Accordingly, it is noticed that the aluminum alloy tube should be subjected to axial compression by the amount of thermal expansion difference to prevent the aluminum alloy tube from being thermally expanded. The axial compression may be accomplished using a device 200 shown in FIG. 3.

Figure 4:
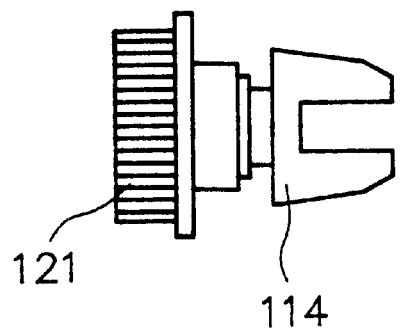
FIG. 4 shows a plan view of a yoke formed each end of the hybrid driveshaft shown in FIG. 1.
Figure 5:
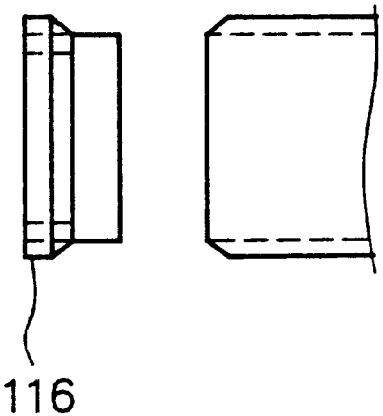
FIG. 5 shows a plan view of an inner serration ring to be engaged with the yoke shown in FIG. 4.
Figure 6:
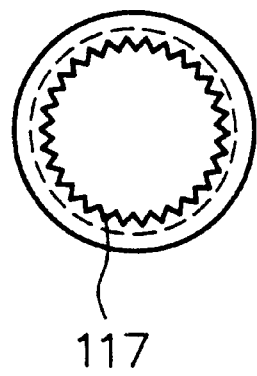
FIG. 6 shows a side view of the inner serration ring shown in FIG. 5.
Figure 7:
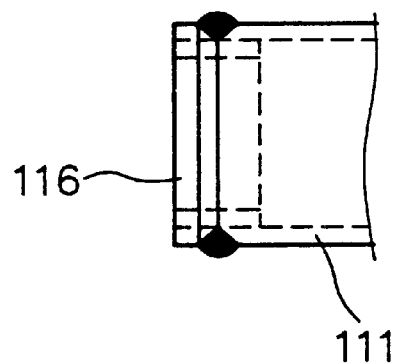
FIG. 7 shows a partial view of the aluminum alloy tube with the inner serration ring shown in FIG. 5 inserted and welded at each end thereof.

The device 200 comprises a moving flange 212, a fixed flange and a nut 214 having handling rods. The aluminum alloy tube 111 is placed between the moving flange 212 and the fixed flange 213. Then, the nut 214 is rotated to move along with a screw while forcing the moving flange 212 to compress the aluminum alloy tube 111. A thrust bearing 216 is placed between the nut 214 and the moving flange 212 to prevent torsion moment by rotation of the nut 214 from being transferred to the aluminum alloy tube 111. In order to heighten interfacial joining strength between the aluminum alloy and the composite material, it is preferred to conduct mechanical surface roughness treatment on the surface of the aluminum alloy tube 111 using a sandpaper, to conduct chemical surface roughness treatment using nitric acid or phosphoric acid, and to clean the surface of the aluminum alloy tube 111 using acetone. Stacking angle of the carbon fiber of the composite material is adjusted to increase the torque transmission capability and the fundamental bending natural frequency of the stem 110. The composite material layer 112 is formed as follows. Fiber-reinforced composite material is stacked on the outer surface of the aluminum alloy tube 111. A pressure tape made of polymer such as polypropylene or polyethylene is winded around the composite material. Then, the aluminum tube 111 with the composite material layer 112 stacked is surrounded by a vacuum bag made from a nylon film endurable under high temperature. Such an assembly is heated in an autoclave under pressurized atmosphere while maintaining the vacuum state in the vacuum bag using a vacuum pump so that the composite material layer 112 is co-cured. When a mechanical element such as a universal joint is connected by welding to the aluminum alloy layer 111 with the composite material layer 112 cured, the carbon fiber epoxy composite is deteriorated by high temperature, and thereby the strength and the specific modulus of the hybrid stem are decreased. With a steel yoke, there is needed an adaptive mechanical element such as a serration portion because the steel yoke can not be welded to the aluminum alloy tube 111. That is, in order to connect the steel yoke 114 shown in FIG. 4 to the stem shown in FIG. 1, an inner serration has to be formed at both ends of the aluminum alloy tube 111. FIGS. 5 and 6 show a plan view and a side view of an inner serration ring 116 to be fitted into the stem 110, respectively. As shown in FIG. 7, the inner serration ring 116 is fitted into the aluminum alloy tube 111 and welded before the composite material is stacked and co-cured. The steel yoke shown in FIG. 4 is fitted into the inner serration ring 116 so that an inner serration 117 of the ring 116 is associated with an outer serration 121 of the steel yoke 114. It is preferred to apply an adhesive into clearance between the both serrations 117 and 121 so that the steel yoke 114 can not get away from the stem 110.

Figure 8:
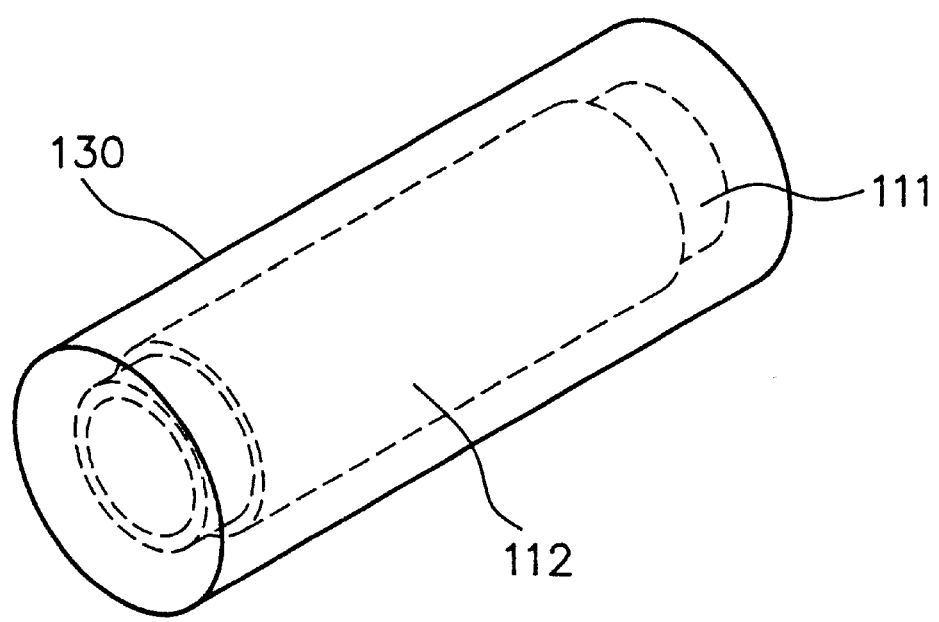
FIG. 8 shows a perspective view of a thermal shrinkage tube surrounding an aluminum alloy tube and composite material.

In a modified method for producing the hybrid stem, instead of the vacuum bag, a thermal shrinkage tube 130 is fitted over the composite material layer 112 as shown in FIG. 8 in which the diameter of the thermal shrinkage tube 130 is slightly larger than that of the composite material layer 112. When the thermal shrinkage tube 130 is heated by a heating gun or in an autoclave, the thermal shrinkage tube 130 is contracted to eliminate voids and volatile in the composite material, which deteriorates the quality of composite structure. Since contraction force of the thermal shrinkage tube 130 is sufficient to exert pressure for promoting consolidation of the composite material, an additive pressurization atmosphere is not required. A polyethylene thermal shrinkage tube is preferred for the composite material cured at 120, while a polypropylene thermal shrinkage tube is preferred for the composite material cured at 180. The hybrid stem produced by this method is not required any additive process for the water resistant, the chemical resistant and the insulated, since the thermal shrinkage tube 130 is acted as water resistant, chemical resistant and insulated coating.

Hereinafter, several modified examples of connecting portions of the stem 110 to with the yoke 114 will be explained.

Figure 9:
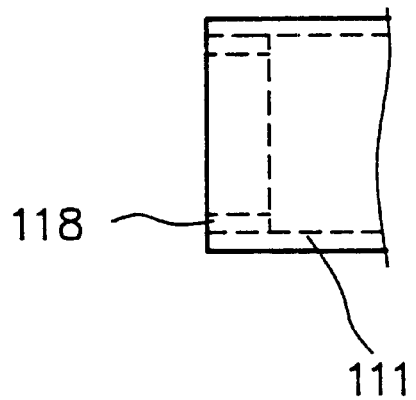
FIG. 9 shows a partial view of the aluminum alloy tube with a stepless inner serration ring shrink-fitted by being forced in heated state.

FIG. 9 shows an inner serration ring 118 shrink-fitted into the aluminum alloy tube 111 in heated state. In this example, a stepless serration ring 118 is used in instead of a stepped serration ring 116 shown in FIGS. 5 and 6.

Figure 10:
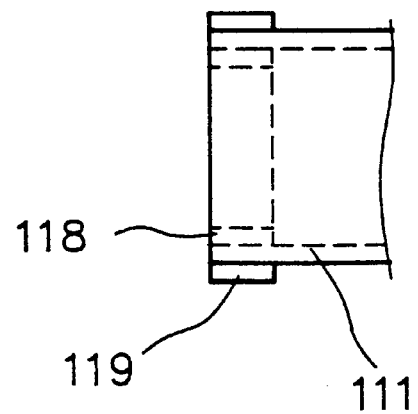
FIG. 10 shows a partial view of the aluminum alloy tube with a compression ring shrink-fitted around a position of the tube corresponding the position of the inner serration ring.

In example shown in FIG. 10, a compression ring 119 is additionally shrink-fitted around a position of the aluminum alloy tube 111 corresponding to the position of the inner serration ring 118 to reinforce connection between the inner serration ring 118 and the aluminum alloy tube 111.

Figure 11:
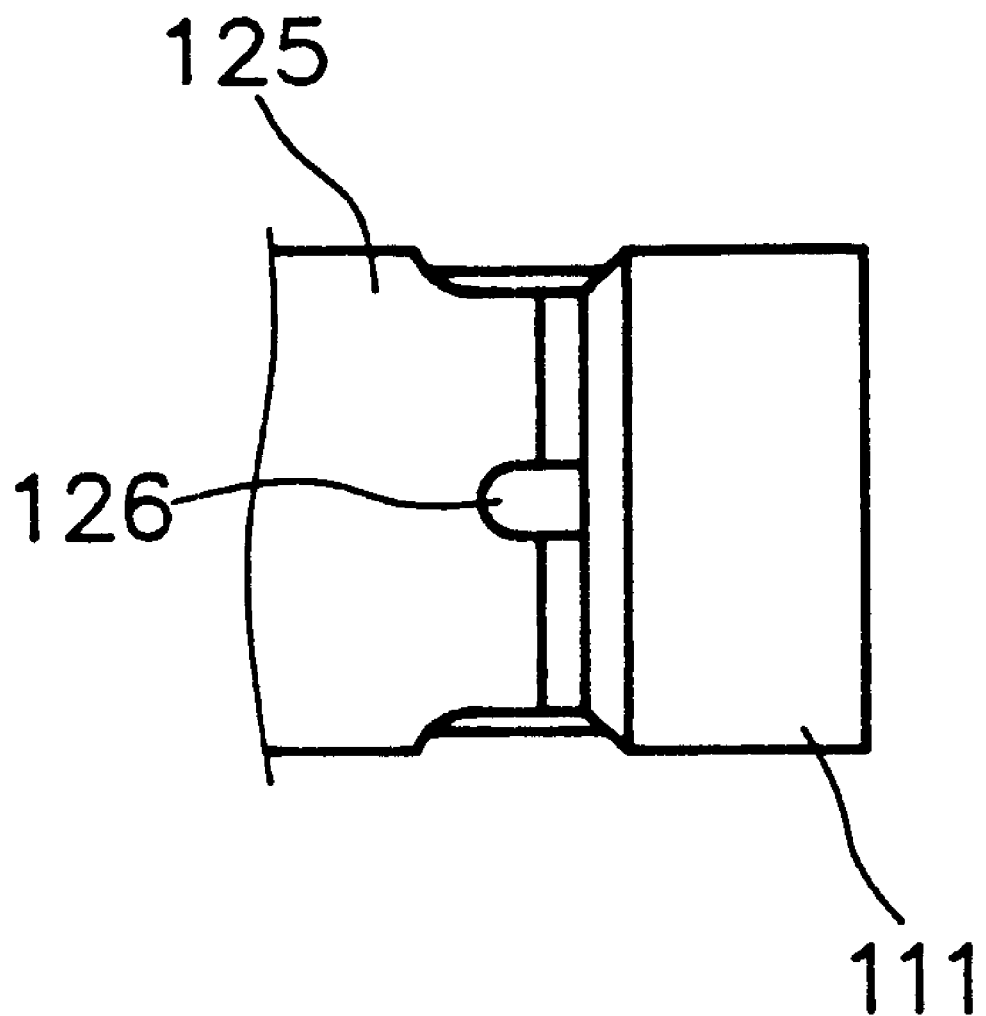
FIG. 11 shows a partial view of the aluminum alloy tube with welding portion of the inner serration ring reinforced by several indentation welding portions.

FIG. 11 shows a partial view of the aluminum alloy tube with welding portion of the inner serration ring reinforced by several indentation welding portions.

Since an aluminum alloy yoke can be directly welded to the aluminum alloy tube, there is not required any serration. In order to increase the strength of butt welding, plug welding may be conducted by drilling several points of the aluminum tube and filling drilled holes with melt. It is preferred to conduct fillet welding after forming indentations 126 at the end of the tube 125 to be welded as shown in FIG. 11.

The present invention has been described in terms of number of embodiments. The invention, however, is not limited to the embodiments depicted and described.

What is claimed is:

1. A method for forming a hybrid shaft adapted to be used as a drive shaft of an automobile transmission system, wherein the hybrid shaft comprises a unitary cylindrical hybrid stem formed from a metal tube and a composite material layer adhered to the metal tube, wherein the metal tube provides torque-transmission strength to the hybrid shaft, while the composite material layer increases a specific modulus of the hybrid shaft, and wherein the method comprises steps for:

stacking a composite material layer on a metal tube;

putting a thermal shrinkage tube on the composite material layer; and co-curing the metal tube and the composite material layer while exerting a longitudinal compression force on the metal tube to prevent it from being thermally expanded.

2. The method according to claim 1 characterized in that the composite material layer is formed of a unidirectional carbon fiber epoxy composite material.

3. The method according to claim 1 or 2, characterized in that the thermal shrinkage tube is made of polyethylene resin or polypropylene resin.

4. The method according to claim 1, characterized in that the hybrid shaft further comprises at least one jointing member fixed to at least one end of the hybrid stem.

5. The method according to claim 4, characterized in that the at least one jointing member comprises at least a yoke member adapted to cooperate with another yoke member to form a universal joint.

6. The method according to claim 1, characterized in that the metal tube is formed of an aluminum alloy.

7. The method according to claim 1, characterized in that the metal tube is hollow.

8. The method according to claim 7, characterized in that the method further comprises steps for:

forming jointing members at both ends of the metal tube before exerting the longitudinal compression force on the metal tube; and stacking the composite material layer on the metal tube.

9. The method according to claim 8, characterized in that the method further comprises a step for performing a mechanical and chemical roughness treatment on an outside surface of the metal tube before stacking the composite material layer on the metal tube.

10. The method according to claim 9, characterized in that:

the step for stacking the composite material layer on the metal tube comprises sub-steps for, stacking a fiber-reinforced composite material on the metal tube, winding a pressure tape made of polymer on the fiber-reinforced composite material, and surrounding the entire metal tube by a vacuum bag made from a nylon film endurable under high temperature.

11. The method according to claim 9, characterized in that the step for co-curing further comprises a sub-step for contracting the thermal shrinkage tube.

12. The method according to claim 9, characterized in that the step for forming the jointing members comprises a sub-step for welding a stepped inner serration ring to the hollow metal tube.

13. The method according to claim 9, characterized in that the step for forming the jointing members comprises a sub-step for fitting a stepless inner serration ring into the hollow metal tube.

14. The method according to claim 13, characterized in that the step for forming the jointing members comprises a sub-step for fitting a compression ring around a position of the hollow metal tube corresponding to the position of the stepless inner serration ring to reinforce connection between the inner serration ring and the hollow metal tube.

15. The method according to claim 9, characterized in that the step for forming the jointing members comprises a sub-step for welding an aluminum alloy yoke to the hollow metal tube.

* * * * *